United States Patent [19]

Dressel et al.

[11] Patent Number: 4,538,357
[45] Date of Patent: Sep. 3, 1985

[54] RAILWAY WHEEL ROTUNDITY GAGE

[75] Inventors: William G. Dressel, Elk Grove Village; William J. Kucera, Elmhurst, both of Ill.

[73] Assignee: AMSTED Industries Incorporated, Chicago, Ill.

[21] Appl. No.: 561,568

[22] Filed: Dec. 15, 1983

[51] Int. Cl.³ ............................................. G01B 5/255
[52] U.S. Cl. .................................. 33/203.18; 33/178 R
[58] Field of Search ................ 33/203, 174 Q, 174 M, 33/178 R, 203.18, 203.19, 203.22

[56] References Cited

U.S. PATENT DOCUMENTS 2,325,362  7/1943  Black ........................... 33/203.19
3,762,057  10/1973 Kaifesh ......................... 33/178 R
4,285,136  8/1981  Ragan ........................... 33/203.18

Primary Examiner—Robert I. Smith
Attorney, Agent, or Firm—Charles E. Bouton; Edward J. Brosius

[57] ABSTRACT

A rotundity gage for measuring the roundness of a wheel tread of a railway wheel. The gage includes a measuring device and is adjustable so as to be capable of measuring different size wheels.

3 Claims, 2 Drawing Figures

U.S. Patent  Sep. 3, 1985  4,538,357
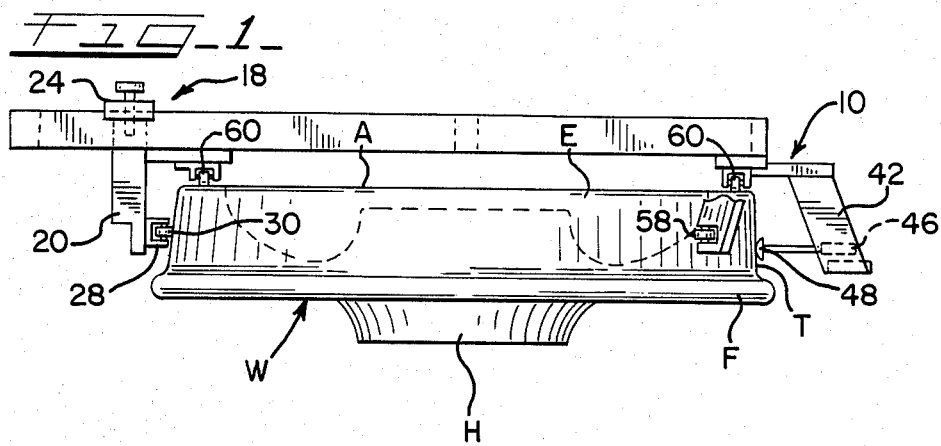
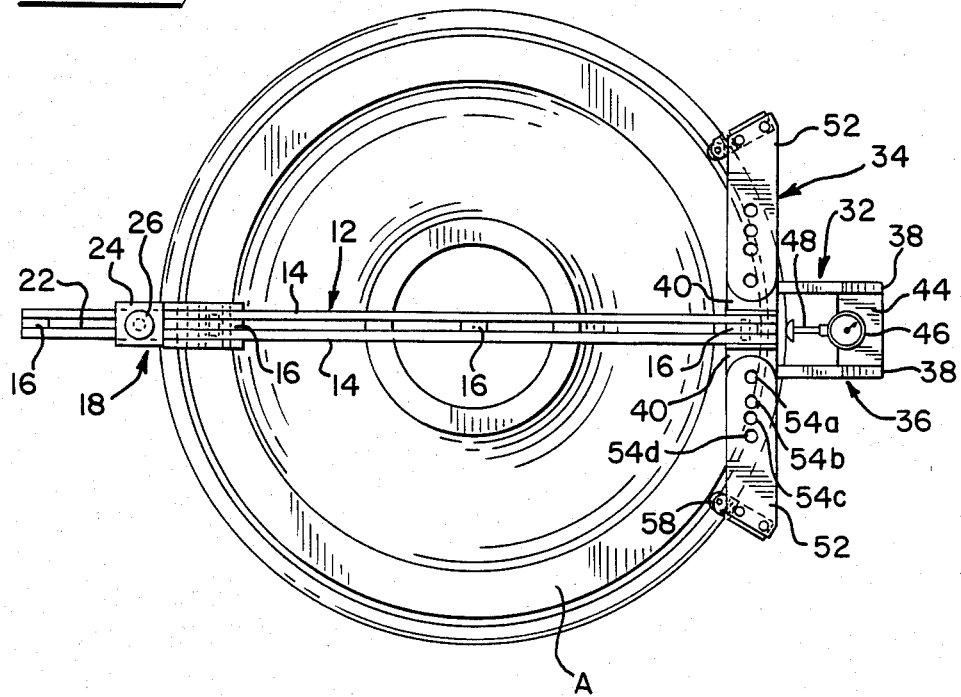

4,538,357

RAILWAY WHEEL ROTUNDITY GAGE

FIELD OF THE INVENTION

The present invention relates to wheel gages and more particularly to a wheel gage for determining the roundness of the tread of a railway wheel.

BACKGROUND OF THE PRESENT INVENTION

Railway wheels are frequently cast from steel by the bottom pressure casting method wherein the molten metal is poured into a graphite mold. This method of casting wheels substantially eliminates any machine finishing of the surfaces with exception of removing risers and the like. One of the main features of this method of forming cast wheels resides in the consistency of the cast article with regard to its size. However, as in all processes, periodic inspections are required to ascertain that all the steps are properly functioning to achieve the desired size consistency. One such inspection is the determination of the roundness of the wheel.

SUMMARY OF THE INVENTION

By the present invention it is proposed to provide a rotundity gage for measuring the roundness or out-of-roundness of railway wheels. The gage is constructed so as to be easily applied to the wheel and simple to use.

The railway wheel rotundity gage comprises generally a cross bar having fixed to one end thereof a perpendicular main bar of which the wheels ride on the face of the wheel and provides support for side rollers engageable with the wheel tread. A measuring means is connected to the end of the cross bar and has a measuring indicator disposed for engagement with the wheel tread. A retention member is slidably connected to the other end of the cross bar and includes a roller engageable with the wheel face and a roller disposed for engagement with the wheel tread in opposition to the side rollers and measuring indicator. The gage is free to rotate about the wheel on the rollers and the measuring indicator will indicate the out-of-roundness, if any, of the wheel tread. If the wheel tread is outside of the tolerance for any given size wheel the latter will be discarded.

A further feature of the gage 10 is the provision of the adjustable outriggers which are secured to the cross bar 12 at selective positions to accommodate different diameters of railway wheels to be measured.

BRIEF DESCRIPTION OF THE DRAWINGS

FIG. 1 is a side elevational view of a railway wheel rotundity gage embodying the structure of the present invention mounted on a railway wheel.

FIG. 2 is a top plan view of the rotundity gage and wheel shown in FIG. 1.

DESCRIPTION OF THE PREFERRED EMBODIMENT

Referring now to the drawings, there is shown a rotundity gage 10 embodying the structure of the present invention. The gage 10 is shown mounted on a railway wheel W of substantially standard construction. The railway wheel W includes a hub H a wheel tread surface T connected to the hub H by an annular face A and a web E. A flange F projects from the wheel tread.

The rotundity gage 10 includes a main cross bar 12 extendable across the diameter of the wheel W. The cross bar 12 includes a pair of laterally spaced upright strips 14 held in spaced relationship by lengthwise spaced spacer blocks 16.

Slidably disposed on one end of the main cross bar 12 is a roller assembly 18. The roller assembly 18 includes a vertical bar 20 of which the upper end is slidably received in a slot 22 defined between the strips 14. Maintaining the bar 20 in a fixed position in the slot 22 is a clamp 24 overlying the bars 14 and releasably clamped thereto by a nut 26.

Fixed to the lower end of the bar 20 is a channel shaped roller support 28 in which there is turnably supported a roller 30 which is engageable with the wheel tread T.

Connected to the other end of the main bar 12 is a measuring gage assembly 32 and an outrigger roller assembly 34. The measuring gage assembly 32 comprises a frame 36 including a pair of projecting straps 38 which are fixed at the inboard ends to bottom plates 40—40 fixed to the bars 14—14. Projecting downwardly from the straps 38—38 are plates 42—42 across the lower ends of which there is fixed a dial gage support platform 44. The housing of a dial indicator 46 for measuring the roundness of the wheel tread T is fixed thereon. The probe 48 of the dial indicator 46 is disposed so as to be engageable with the wheel tread T.

Fixed as by a pair of pins (not shown) on each side of the main bar 12 are outrigger plates 52 of the outrigger assembly 34. The outrigger plates 52 each include a plurality of openings 54a, 54b, 54c and 54d which are alignable with corresponding spaced but lengthwise openings (not shown) provided in the plates 40 so that the outrigger plates 52 may be adjusted for measuring different diameter wheels. The outrigger plates 52 are maintained in the desired position by bolts or pins extending through the selective opening 54 and one of the aligned openings in the under plate 40. The other of the bolts may extend through any one of the other openings that are aligned.

Extending downwardly from the outer ends of each of the outrigger plates 52 are straps 56 adjacent the free ends of which there is fixed a spring loaded roller assembly 58 which is continuously engageable with the wheel tread T.

A roller assembly 60 is also fixed to the main bar 12 at the bar spacer 16. The roller assembly 60 engages the wheel face A.

The gage 10 is applied to the wheel W by placing the main cross bar 12 diametrically across the wheel W and the roller 30 is selectively moved and fixed in place so that it engages the wheel tread T along with the roller 58—58 on the outrigger plates 52. In this position the dial indicator probe 48 also engages the wheel tread T. The main frame 12 is then rotated on the rollers 60 located on each end of the main frame 12. During rotation the dial indicator is observed to note any variation or deviation from a true round surface. If the out-of-roundness is excessive the wheel W may be discarded or repaired and other corrective action along the production line may be taken.

What is claimed is:

1. A rotundity gage for measuring the roundness of the outer tread of a railway wheel, said gage comprising
    a main cross bar for extending diametrically across the diameter of the railway wheel, and adapted to be rotated across a face of the wheel, a roller means mounted for lengthwise adjustment on said cross bar for engaging the wheel tread, a pair of angularly spaced roller means mounted on the other end of said cross bar and engageable with the wheel tread in opposition to said adjustable roller means, a dial indicator means having a plunger mounted on said main cross bar and having a plunger engageable with the wheel tread between said angular spaced roller means for indicating the out-of-roundness of the wheel tread when said main cross bar is rotated.

2. The invention as defined in claim 1 wherein said roller means on said other end of said main cross bar are mounted on adjustably mounted outriggers, said roller being mounted on said outriggers whereby when said outriggers are adjusted said rollers are accommodated to engage different size wheels.

3. The invention as defined in claim 1 wherein said cross bar is provided with two rollers spaced apart sufficiently to support said cross bar upon a face of a wheel and oriented to enable said cross bar to be rotated about said wheel when resting thereon.

* * * * *